US008082311B2

(12) United States Patent  (10) Patent No.: US 8,082,311 B2
Youstra                    (45) Date of Patent:     Dec. 20, 2011

(54) AUTHENTICATION OF ELECTRONIC DATA

(75) Inventor: William N. Youstra, Portola Valley, CA (US)

(73) Assignee: AOL LLC, Dulles, VA (US)

( * ) Notice: Subject to any disclaimer, the term of this patent is extended or adjusted under 35 U.S.C. 154(b) by 83 days.

(21) Appl. No.: 12/535,419

(22) Filed: Aug. 4, 2009

(65) Prior Publication Data
US 2010/0094942 A1   Apr. 15, 2010

Related U.S. Application Data

(63) Continuation of application No. 09/867,797, filed on May 31, 2001, now Pat. No. 7,571,234.

(60) Provisional application No. 60/210,027, filed on Jun. 8, 2000.

(51) Int. Cl.
G06F 15/16  (2006.01)

(52) U.S. Cl. .................... 709/206; 709/203; 709/223

(58) Field of Classification Search ............. 709/203, 709/227, 228, 232, 206, 223, 224
See application file for complete search history.

(56) References Cited

U.S. PATENT DOCUMENTS

| 5,327,486 A | 7/1994 | Wolff et al. |
| 5,533,110 A | 7/1996 | Pinard et al. |
| 5,557,659 A | 9/1996 | Hyde-Thomson |
| 5,583,920 A | 12/1996 | Wheeler, Jr. |
| 5,793,365 A | 8/1998 | Tang et al. |
| 5,832,227 A * | 11/1998 | Anderson et al. ............. 709/224 |
| 5,872,917 A | 2/1999 | Hellman |
| 5,878,219 A | 3/1999 | Vance, Jr. et al. |
| 5,937,160 A | 8/1999 | Davis et al. |
| 5,960,411 A | 9/1999 | Hartman et al. |
| 6,006,228 A | 12/1999 | McCollum et al. |
| 6,012,051 A | 1/2000 | Sammon, Jr. et al. |
| 6,014,638 A | 1/2000 | Burge et al. |
| 6,026,403 A | 2/2000 | Siefert |
| 6,052,709 A | 4/2000 | Paul |
| 6,107,990 A | 8/2000 | Chaney et al. |
| 6,151,584 A | 11/2000 | Papierniak et al. |
| 6,341,349 B1 * | 1/2002 | Takaragi et al. ............. 713/168 |
| 6,356,937 B1 | 3/2002 | Montville et al. |
| 6,393,465 B2 | 5/2002 | Leeds |
| 6,438,597 B1 | 8/2002 | Mosberger et al. |
| 6,584,564 B2 * | 6/2003 | Olkin et al. .................. 713/152 |
| 6,640,301 B1 | 10/2003 | Ng |
| 6,691,156 B1 | 2/2004 | Drummond et al. |
| 6,714,982 B1 | 3/2004 | McDonough et al. |

(Continued)

FOREIGN PATENT DOCUMENTS

| EP | 0 851 335 | 7/1998 |
| EP | 0 982 927 | 3/2000 |

OTHER PUBLICATIONS

"AOL technology: turning complicated things into engaging services", 1996 Annual Report, 22 pages.

(Continued)

*Primary Examiner* — Lashonda Jacobs
(74) *Attorney, Agent, or Firm* — Fish & Richardson P.C.

(57) ABSTRACT

Systems and techniques for transmitting electronic data by receiving, at a communications system host, electronic data transmitted from a sender and addressed to an intended recipient; authenticating the electronic data based on attributes of the electronic data and appending information to the electronic data indicating that the electronic data has been authenticated.

15 Claims, 10 Drawing Sheets

U.S. PATENT DOCUMENTS

| | | | |
|---|---|---|---|
| 6,725,381 | B1 | 4/2004 | Smith et al. |
| 6,745,936 | B1 | 6/2004 | Movalli et al. |
| 6,760,752 | B1 | 7/2004 | Liu et al. |
| 6,766,352 | B1 | 7/2004 | McBrearty et al. |
| 6,785,679 | B1 * | 8/2004 | Dane et al. .............................. 1/1 |

OTHER PUBLICATIONS

"YAHOO! Messenger Makes the World a Little Smaller, More Informed", pp. 1-2, Jun. 21, 1999.

Alan Cohen, "Instant Messaging", Apr. 13, 1999, PC Magazine, PC Labs, 2 pages.

"AOL Instant Messenger Windows Beta Features", Jun. 24, 1999, 2 pages, AOL Instant Messenger All New Version 2.0, 2 pages, Jun. 24, 1999, What is AOL Instant Messanger, 3 pages, Jun. 24, 1999, Quick Tips for Getting Started, 5 pages, Jun. 24, 1999, Frequently Asked Questions About AOL Instant Messenger, 6 pages, Jun. 24, 1999.

* cited by examiner

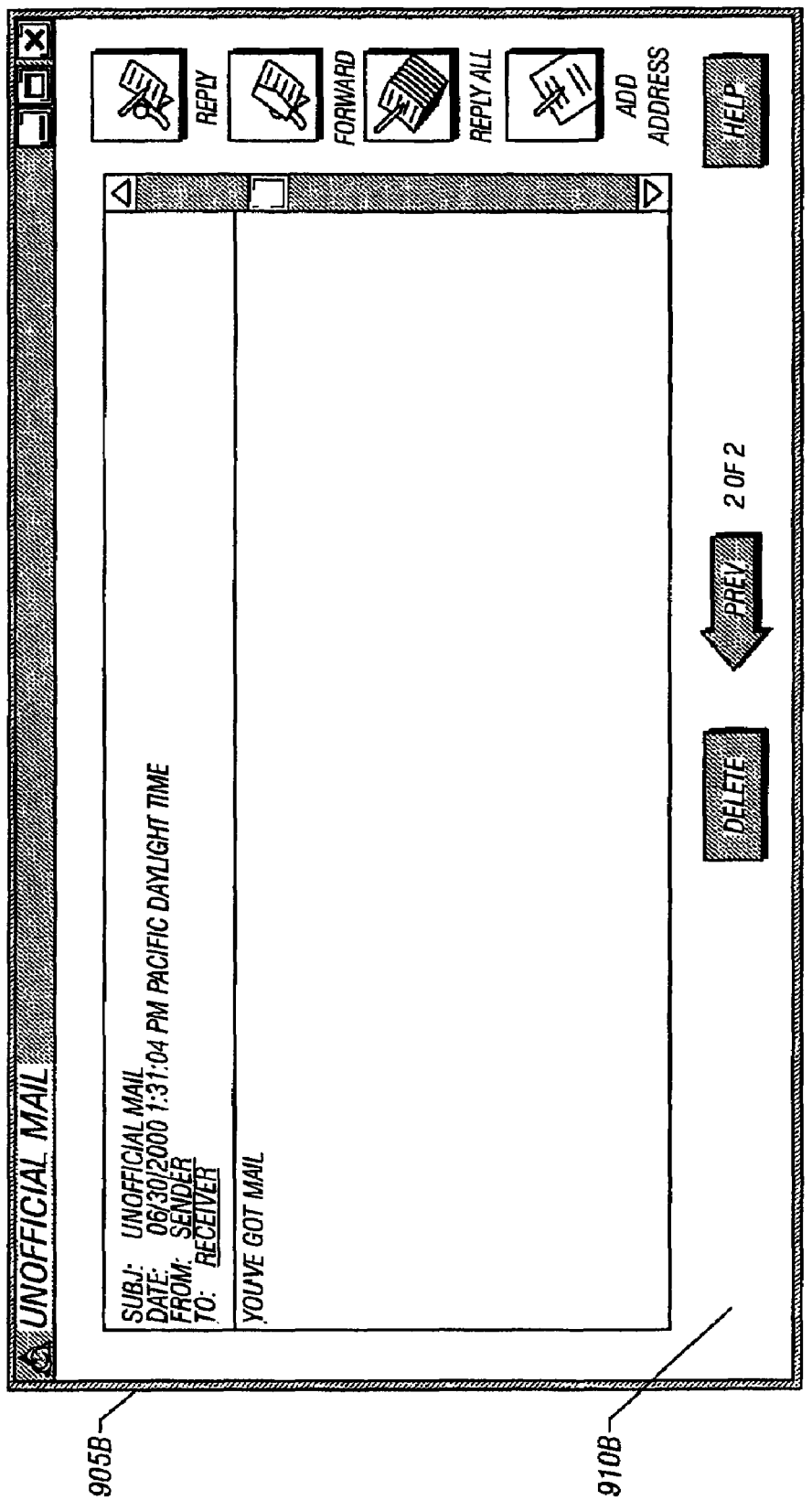

AUTHENTICATION OF ELECTRONIC DATA

This application is a continuation of U.S. patent application Ser. No. 09/867,797, filed May 31, 2001, now U.S. Pat. No. 7,571,234, issued Aug. 4, 2009, which claims the benefit of U.S. Provisional Application No. 60/210,027 filed Jun. 8, 2000, both of which are incorporated by reference herein in their entirety.

TECHNICAL FIELD

The present invention relates generally to identification of an e-mail sender.

BACKGROUND

E-mail allows people to communicate with others around the world using the Internet. Unfortunately, the growth of the Internet has resulted in growth of the problem of "spam" or "junk" e-mail. Junk e-mail is unsolicited, unwelcome e-mail that is a problem facing every Internet user. It is annoying, unwanted and can often be fraudulent or offensive.

Subscribers to online service providers are often targets of spammers and hackers who attempt to gain access to confidential information including, for example, screen names, passwords, and credit card information. One tactic employed by many spammers and hackers is impersonating official personnel in order to trick the subscriber into providing confidential information.

SUMMARY

In one general aspect, electronic data is transmitted by receiving, at a communications system host, electronic data transmitted from a sender and addressed to an intended recipient; authenticating the electronic data based on attributes of the electronic data; and appending information to the electronic data indicating that the electronic data has been authenticated.

Implementations may include one or more of the following features. For example, the sender of the electronic data may be identified using, for example, a screen name and/or an IP address. A level of security corresponding to the sender of the electronic data may be designated and whether one attribute of the electronic data is an attribute of an authorized sender may be verified. The attribute may be a screen name and/or an IP address. Contents of the electronic data may be stored in a first storage area of the communications system host and attributes of the electronic data may be stored in a second storage area of the communications system host.

The appended information may be presented to the intended recipient with attributes of the electronic data and/or contents of the electronic data. The intended recipient may render the appended information as an icon and/or as a graphical user interface. The graphical user interface may include a border indicative of verification around the contents of the electronic data.

In another general aspect, electronic data are transmitted from a sender to an intended recipient through a communications system that authenticates the electronic data based on attributes of the electronic data. In particular, information indicating that the electronic data has been authenticated is received from a communications systems host, and information is rendered to the intended recipient so as to inform the intended recipient that the electronic data have been authenticated.

The intended recipient may be presented with the information as an icon and/or as a graphical user interface. The graphical user interface may include a border indicative of verification around the contents of the electronic data. The information may be rendered with contents of the electronic data and/or attributes of the electronic data.

In another general aspect, a graphical user interface for rendering information associated with electronic data transmitted from a sender to an intended recipient includes a distinctive border around contents of the electronic data. The graphical user interface displays the border to the intended recipient so as to inform the intended recipient that the electronic data has been authenticated.

These and other general aspects may be implemented by an apparatus and/or a computer program stored on a computer readable medium. The computer readable medium may be a disc, a client device, a host device, and/or a propagated signal.

Other features and advantages will be apparent from the following description, including the drawings, and from the claims.

DETAILED DESCRIPTION

For illustrative purposes, FIGS. 1-5 describe a communications system for implementing techniques for transferring electronic data. For brevity, several elements in the figures described below are represented as monolithic entities. However, as would be understood by one skilled in the art, these elements each may include numerous interconnected computers and components designed to perform a set of specified operations and/or dedicated to a particular geographical region.

Figure 1:
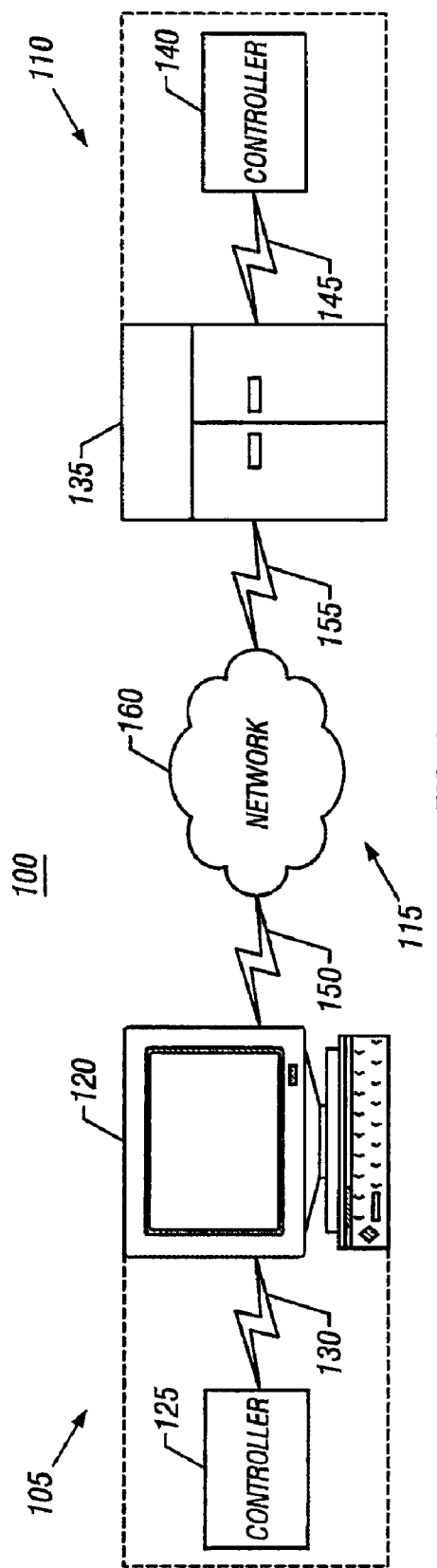
FIG. 1 is a block diagram of a communications system.

Referring to FIG. 1, a communications system 100 is capable of delivering and exchanging data between a client system 105 and a host system 110 through a communications link 115. The client system 105 typically includes one or more client devices 120 and/or client controllers 125. For example, the client system 105 may include one or more general-purpose computers (e.g., personal computers), one or more special-purpose computers (e.g., devices specifically programmed to communicate with each other and/or the host system 110), or a combination of one or more general-purpose computers and one or more special-purpose computers. The client system 105 may be arranged to operate within or in concert with one or more other systems, such as for example, one or more LANs ("Local Area Networks") and/or one or more WANs ("Wide Area Networks").

The client device 120 is generally capable of executing instructions under the command of a client controller 125. The client device 120 is connected to the client controller 125 by a wired or wireless data pathway 130 capable of delivering data.

The client device 120 and client controller 125 each typically includes one or more hardware components and/or software components. An example of a client device 120 is a general-purpose computer (e.g., a personal computer) capable of responding to and executing instructions in a defined manner. Other examples include a special-purpose computer, a workstation, a server, a device, a component, other equipment or some combination thereof capable of responding to and executing instructions. An example of client controller 125 is a software application loaded on the client device 120 for commanding and directing communications enabled by the client device 120. Other examples include a program, a piece of code, an instruction, a device, a computer, a computer system, or a combination thereof, for independently or collectively instructing the client device 120 to interact and operate as described herein. The client controller 125 may be embodied permanently or temporarily in any type of machine, component, equipment, storage medium, or propagated signal capable of providing instructions to the client device 120.

The communications link 115 typically includes a delivery network 160 making a direct or indirect communication between the client system 105 and the host system 110, irrespective of physical separation. Examples of a delivery network 160 include the Internet, the World Wide Web, WANs, LANs, analog or digital wired and wireless telephone networks (e.g. PSTN, ISDN, or xDSL), radio, television, cable, satellite, and/ or any other delivery mechanism for carrying data. The communications link 115 may include communication pathways 150, 155 that enable communications through the one or more delivery networks 160 described above. Each of the communication pathways 150, 155 may include, for example, a wired, wireless, cable or satellite communication pathway.

The host system 110 includes a host device 135 capable of executing instructions under the command and direction of a host controller 140. The host device 135 is connected to the host controller 140 by a wired or wireless data pathway 145 capable of carrying and delivering data.

The host system 110 typically includes one or more host devices 135 and/or host controllers 140. For example, the host system 110 may include one or more general-purpose computers (e.g., personal computers), one or more special-purpose computers (e.g., devices specifically programmed to communicate with each other and/or the client system 105), or a combination of one or more general-purpose computers and one or more special-purpose computers. The host system 110 may be arranged to operate within or in concert with one or more other systems, such as, for example, one or more LANs ("Local Area Networks") and/or one or more WANs ("Wide Area Networks").

The host device 135 and host controller 140 each typically includes one or more hardware components and/or software components. An example of a host device 135 is a general-purpose computer (e.g., a personal computer) capable of responding to and executing instructions in a defined manner. Other examples include a special-purpose computer, a workstation, a server, a device, a component, other equipment or some combination thereof capable of responding to and executing instructions. An example of host controller 140 is a software application loaded on the host device 135 for commanding and directing communications enabled by the host device 135. Other examples include a program, a piece of code, an instruction, a device, a computer, a computer system, or a combination thereof, for independently or collectively instructing the host device 135 to interact and operate as described herein. The host controller 140 may be embodied permanently or temporarily in any type of machine, component, equipment, storage medium, or propagated signal capable of providing instructions to the host device 135.

Figure 2:
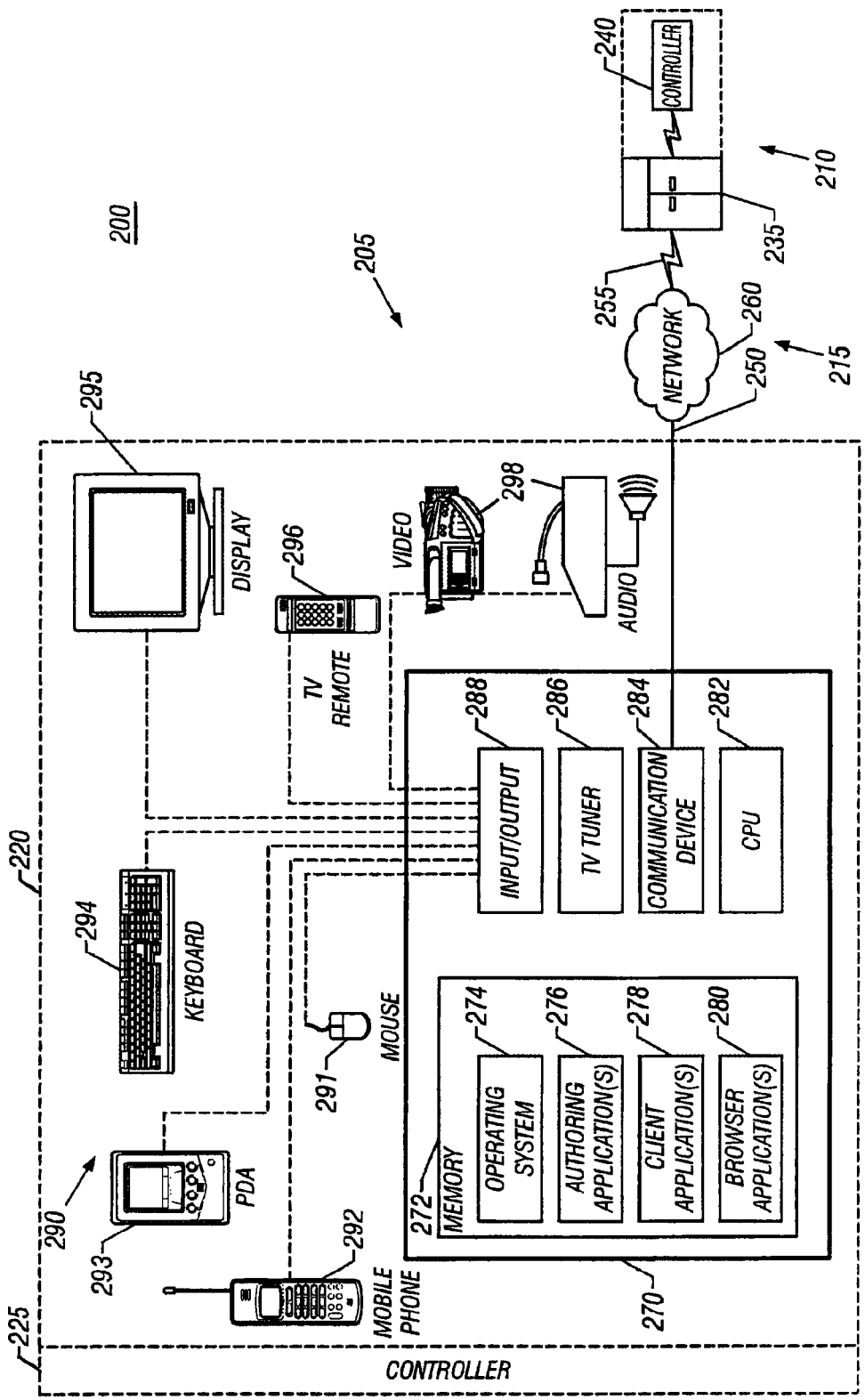
FIGS. 2-6 are block diagrams of expansions of aspects the block diagram of FIG. 1.

FIG. 2 illustrates a communication system 200 including a client system 205 communicating with a host system 210 through a communications link 215. Client system 205 typically includes one or more client devices 220 and one or more client controllers 225 for controlling the client devices 220. Host system 210 typically includes one or more host devices 235 and one or more host controllers 240 for controlling the host devices 235. The communications link 215 may include communication pathways 250, 255 enabling communications through the one or more delivery networks 260.

Examples of each element within the communication system of FIG. 2 are broadly described above with respect to FIG. 1. In particular, the host system 210 and communications link 215 typically have attributes comparable to those described with respect to host system 110 and communications link 115 of FIG. 1. Likewise, the client system 205 of FIG. 2 typically has attributes comparable to and illustrates one possible embodiment of the client system 105 of FIG. 1.

The client device 220 typically includes a general purpose computer 270 having an internal or external storage 272 for storing data and programs such as an operating system 274 (e.g., DOS, Windows™, Windows 95™, Windows 98™, Windows 2000™, Windows NT™, OS/2, or Linux) and one or more application programs. Examples of application programs include authoring applications 276 (e.g., word processing, database programs, spreadsheet programs, or graphics programs) capable of generating documents or other electronic content; client applications 278 (e.g., AOL client, CompuServe client, AIM client, AOL TV client, or ISP client) capable of communicating with other computer users, accessing various computer resources, and viewing, creating, or otherwise manipulating electronic content; and browser applications 280 (e.g., Netscape's Navigator or Microsoft's Internet Explorer) capable of rendering standard Internet content.

The general-purpose computer 270 also includes a central processing unit 282 (CPU) for executing instructions in response to commands from the client controller 225. In one implementation, the client controller 225 includes one or more of the application programs installed on the internal or external storage 272 of the general-purpose computer 270. In another implementation, the client controller 225 includes application programs externally stored in and performed by one or more device(s) external to the general-purpose computer 270.

The general-purpose computer typically will include a communication device 284 for sending and receiving data. One example of the communication device 284 is a modem. Other examples include a transceiver, a set-top box, a communication card, a satellite dish, an antenna, or another network adapter capable of transmitting and receiving data over the communications link 215 through a wired or wireless data pathway 250. The general-purpose computer 270 also may include a TV ("television") tuner 286 for receiving television programming in the form of broadcast, satellite, and/or cable TV signals. As a result, the client device 220 can selectively and/or simultaneously display network content received by communications device 284 and television programming content received by the TV tuner 286.

The general-purpose computer 270 typically will include an input/output interface 288 for wired or wireless connection to various peripheral devices 290. Examples of peripheral devices 290 include, but are not limited to, a mouse 291, a mobile phone 292, a personal digital assistant 293 (PDA), a keyboard 294, a display monitor 295 with or without a touch screen input, a TV remote control 296 for receiving information from and rendering information to subscribers, and an audiovisual input device 298.

Although FIG. 2 illustrates devices such as a mobile telephone 292, a PDA 293, and a TV remote control 296 as being peripheral with respect to the general-purpose computer 270, in another implementation, such devices may themselves include the functionality of the general-purpose computer 270 and operate as the client device 220. For example, the mobile phone 292 or the PDA 293 may include computing and networking capabilities and function as a client device 220 by accessing the delivery network 260 and communicating with the host system 210. Furthermore, the client system 205 may include one, some or all of the components and devices described above.

Figure 3:
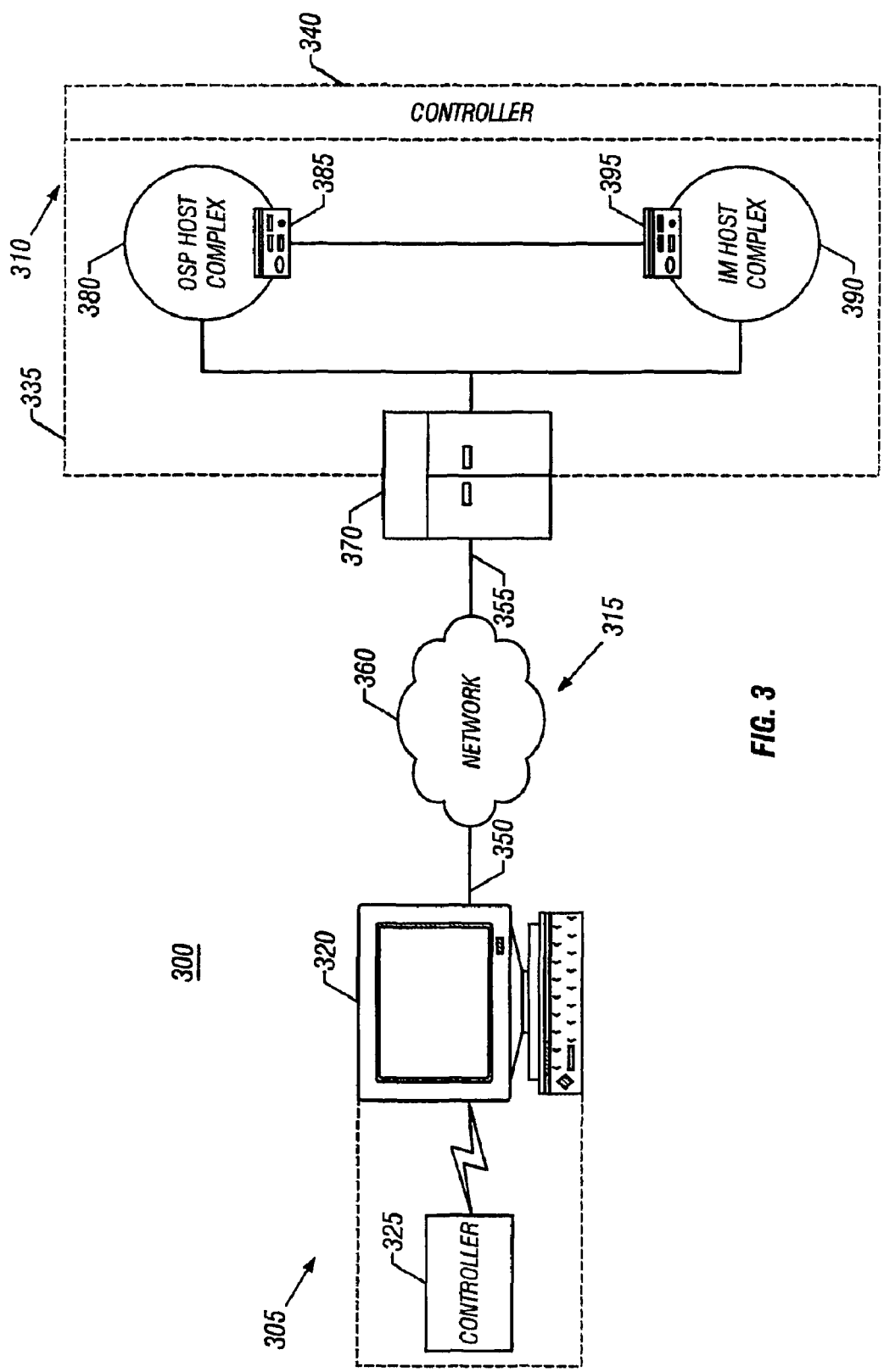

Referring to FIG. 3, a communications system 300 is capable of delivering and exchanging information between a client system 305 and a host system 310 through a communication link 315. Client system 305 typically includes one or more client devices 320 and one or more client controllers 325 for controlling the client devices 320. Host system 310 typically includes one or more host devices 335 and one or more host controllers 340 for controlling the host devices 335. The communications link 315 may include communication pathways 350, 355 enabling communications through the one or more delivery networks 360.

Examples of each element within the communication system of FIG. 3 are broadly described above with respect to FIGS. 1 and 2. In particular, the client system 305 and the communications link 315 typically have attributes comparable to those described with respect to client systems 105 and 205 and communications links 115 and 215 of FIGS. 1 and 2. Likewise, the host system 310 of FIG. 3 may have attributes comparable to and illustrates one possible embodiment of the host systems 110 and 210 shown in FIGS. 1 and 2, respectively.

The host system 310 includes a host device 335 and a host controller 340. The host controller 340 is generally capable of transmitting instructions to any or all of the elements of the host device 335. For example, in one implementation, the host controller 340 includes one or more software applications loaded on the host device 335. However, in other implementations, as described above, the host controller 340 may include any of several other programs, machines, and devices operating independently or collectively to control the host device 335.

The host device 335 includes a login server 370 for enabling access by subscribers and routing communications between the client system 305 and other elements of the host device 335. The host device 335 also includes various host complexes such as the depicted OSP ("Online Service Provider") host complex 380 and IM ("Instant Messaging") host complex 390. To enable access to these host complexes by subscribers, the client system 305 includes communication software, for example, an OSP client application and an IM client application. The OSP and IM communication software applications are designed to facilitate the subscriber's interactions with the respective services and, in particular, may provide access to all the services available within the respective host complexes.

Typically, the OSP host complex 380 supports different services, such as email, discussion groups, chat, news services, and Internet access. The OSP host complex 380 is generally designed with an architecture that enables the machines within the OSP host complex 380 to communicate with each other and employs certain protocols (i.e., standards, formats, conventions, rules, and structures) to transfer data. The OSP host complex 380 ordinarily employs one or more OSP protocols and custom dialing engines to enable access by selected client applications. The OSP host complex 380 may define one or more specific protocols for each service based on a common, underlying proprietary protocol.

The IM host complex 390 is generally independent of the OSP host complex 380, and supports instant messaging services irrespective of a subscriber's network or Internet access. Thus, the IM host complex 390 allows subscribers to send and receive instant messages, whether or not they have access to any particular ISP. The IM host complex 390 may support associated services, such as administrative matters, advertising, directory services, chat, and interest groups related to the instant messaging. The IM host complex 390 has an architecture that enables all of the machines within the IM host complex to communicate with each other. To transfer data, the IM host complex 390 employs one or more standard or exclusive IM protocols.

The host device 335 may include one or more gateways that connect and therefore link complexes, such as the OSP host complex gateway 385 and the IM host complex gateway 395. The OSP host complex gateway 385 and the IM host complex 395 gateway may directly or indirectly link the OSP host complex 380 with the IM host complex 390 through a wired or wireless pathway. Ordinarily, when used to facilitate a link between complexes, the OSP host complex gateway 385 and the IM host complex gateway 395 are privy to information regarding the protocol type anticipated by a destination complex, which enables any necessary protocol conversion to be performed incident to the transfer of data from one complex to another. For instance, the OSP host complex 380 and IM host complex 390 generally use different protocols such that transferring data between the complexes requires protocol conversion by or at the request of the OSP host complex gateway 385 and/or the IM host complex gateway 395.

Figure 4:
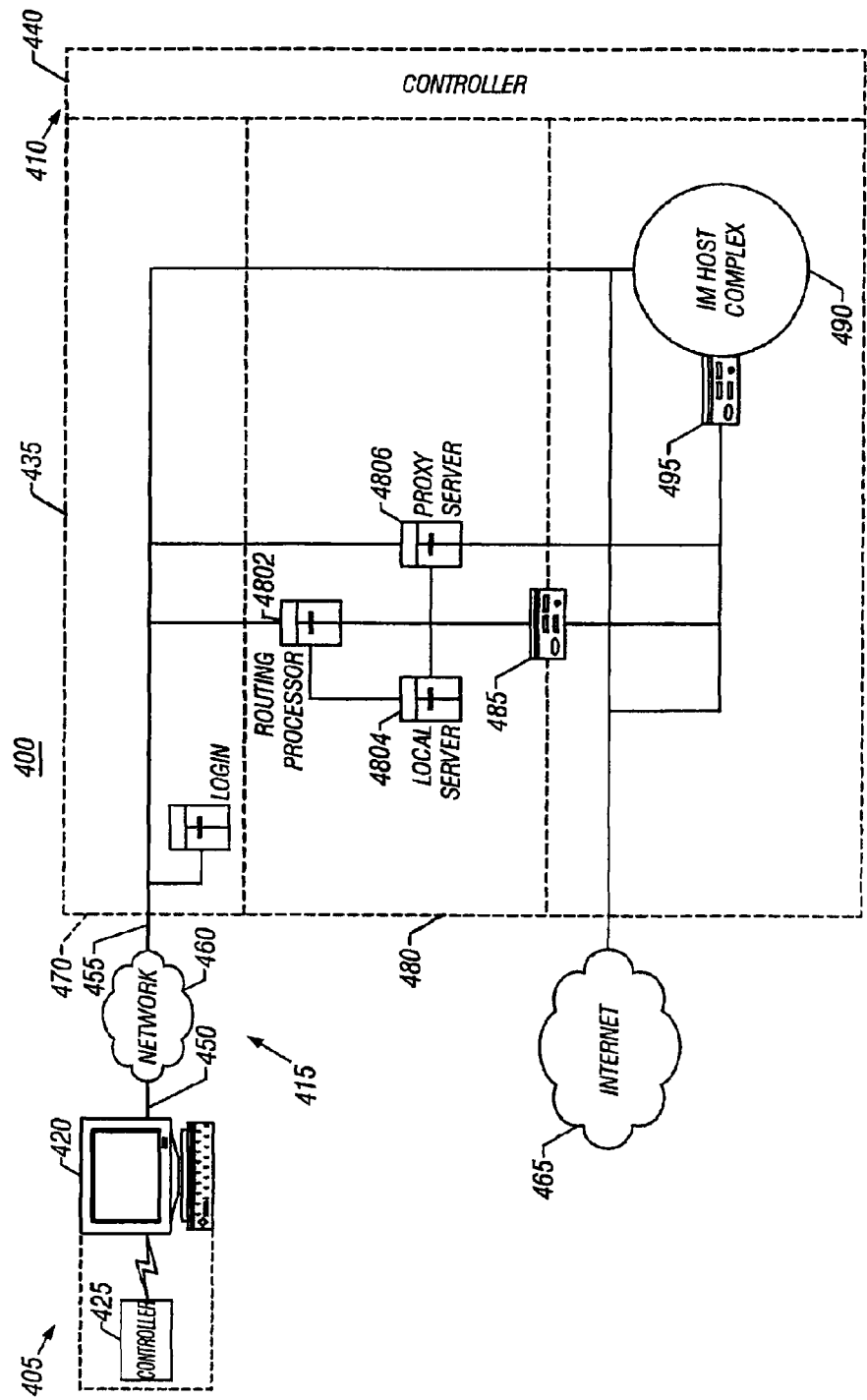

Referring to FIG. 4, a communications system 400 is capable of delivering and exchanging information between a client system 405 and a host system 410 through a communication link 415. Client system 405 typically includes one or more client devices 420 and one or more client controllers 425 for controlling the client devices 420. Host system 410 typically includes one or more host devices 435 and one or more host controllers 440 for controlling the host devices 435. The communications link 415 may include communication pathways 450, 455 enabling communications through the one or more delivery networks 460. As shown, the client system 405 may access the Internet 465 through the host system 410.

Examples of each element within the communication system of FIG. 4 are broadly described above with respect to FIGS. 1-3. In particular, the client system 405 and the communications link 415 typically have attributes comparable to those described with respect to client systems 105, 205, and 305 and communications links 115, 215, and 315 of FIGS. 1-3. Likewise, the host system 410 of FIG. 4 may have attributes comparable to and illustrates one possible embodiment of the host systems 110, 210, and 310 shown in FIGS. 1-3, respectively. However, FIG. 4 describes an aspect of the host system 410, focusing primarily on one particular implementation of OSP host complex 480. For purposes of communicating with an OSP host complex 480, the delivery network 460 is generally a telephone network.

The client system 405 includes a client device 420 and a client controller 425. The client controller 425 is generally capable of establishing a connection to the host system 410, including the OSP host complex 480, the IM host complex 490 and/or the Internet 465. In one implementation, the client controller 425 includes an OSP application for communicating with servers in the OSP host complex 480 using exclusive OSP protocols. The client controller 425 also may include applications, such as an IM client application, and/or an Internet browser application, for communicating with the IM host complex 490 and the Internet 465.

The host system 410 includes a host device 435 and a host controller 440. The host controller 440 is generally capable of transmitting instructions to any or all of the elements of the host device 435. For example, in one implementation, the host controller 440 includes one or more software applications loaded on one or more elements of the host device 435. However, in other implementations, as described above, the host controller 440 may include any of several other programs, machines, and devices operating independently or collectively to control the host device 435.

The host system 410 includes a login server 470 capable of enabling communications with and authorizing access by client systems 405 to various elements of the host system 410, including an OSP host complex 480 and an IM host complex 490. The login server 470 may implement one or more authorization procedures to enable simultaneous access to the OSP host complex 480 and the IM host complex 490. The OSP host complex 480 and the IM host complex 490 are connected through one or more OSP host complex gateways 485 and one or more IM host complex gateways 495. Each OSP host complex gateway 485 and IM host complex gateway 495 may perform any protocol conversions necessary to enable communication between the OSP host complex 480, the IM host complex 490, and the Internet 465.

The OSP host complex 480 supports a set of services from one or more servers located internal to and external from the OSP host complex 480. Servers external to the OSP host complex 480 generally may be viewed as existing on the Internet 465. Servers internal to the OSP complex 480 may be arranged in one or more configurations. For example, servers may be arranged in centralized or localized clusters in order to distribute servers and subscribers within the OSP host complex 480.

In the implementation of FIG. 4, the OSP host complex 480 includes a routing processor 4802. In general, the routing processor 4802 will examine an address field of a data request, use a mapping table to determine the appropriate destination for the data request, and direct the data request to the appropriate destination. In a packet-based implementation, the client system 405 may generate information requests, convert the requests into data packets, sequence the data packets, perform error checking and other packet-switching techniques, and transmit the data packets to the routing processor 4802. Upon receiving data packets from the client system 405, the routing processor 4802 may directly or indirectly route the data packets to a specified destination within or outside of the OSP host complex 480. For example, in the event that a data request from the client system 405 can be satisfied locally, the routing processor 4802 may direct the data request to a local server 4804. In the event that the data request cannot be satisfied locally, the routing processor 4802 may direct the data request externally to the Internet 465 or the IM host complex 490 through the gateway 485.

The OSP host complex 480 also includes a proxy server 4806 for directing data requests and/or otherwise facilitating communication between the client system 405 and the Internet 465 through. The proxy server 4802 may include an IP ("Internet Protocol") tunnel for converting data from OSP protocol into standard Internet protocol and transmitting the data to the Internet 465. The IP tunnel also converts data received from the Internet in the standard Internet protocol back into the OSP protocol and sends the converted data to the routing processor 4802 for delivery back to the client system 405.

The proxy server 4806 also may allow the client system 405 to use standard Internet protocols and formatting to access the OSP host complex 480 and the Internet 465. For example, the subscriber can use an OSP TV client application having an embedded browser application installed on the client system 405 to generate a request in standard Internet protocol, such as HTTP ("HyperText Transport Protocol"). In a packet-based implementation, data packets may be encapsulated inside a standard Internet tunneling protocol, such as, for example, UDP ("User Datagram Protocol") and routed to the proxy server 4806. The proxy server 4806 may include a L2TP ("Layer Two Tunneling Protocol") tunnel capable of establishing a point-to-point protocol (PPP) session with the client system 405.

The proxy server 4806 also may act as a buffer between the client system 405 and the Internet 465, and may implement content filtering and time saving techniques. For example, the proxy server 4806 can check parental controls settings of the client system 405 and request and transmit content from the Internet 465 according to the parental control settings. In addition, the proxy server 4806 may include one or more caches for storing frequently accessed information. If requested data is determined to be stored in the caches, the proxy server 4806 may send the information to the client system 405 from the caches and avoid the need to access the Internet 465.

Figure 5:
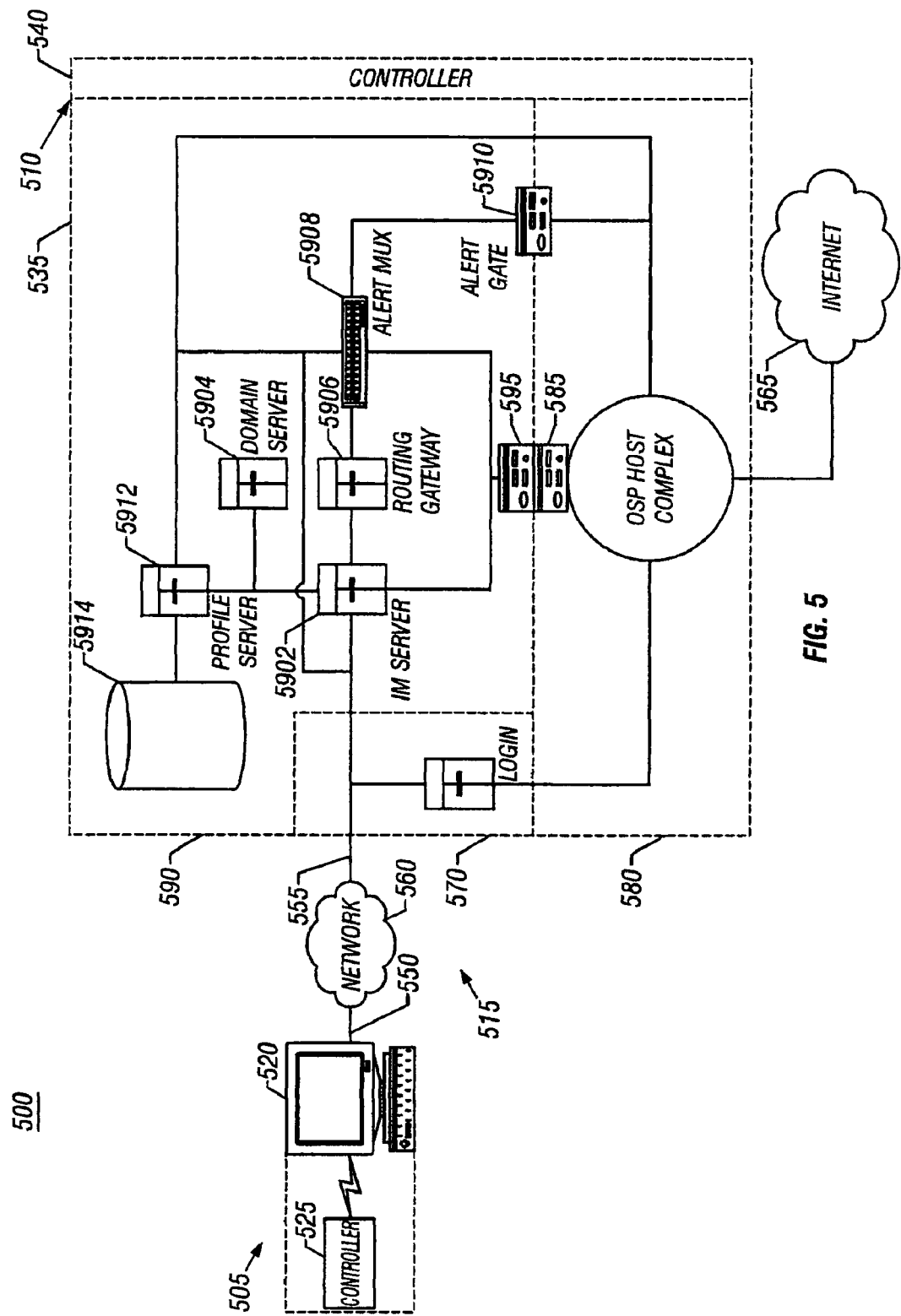

Referring to FIG. 5, a communications system 500 is capable of delivering and exchanging information between a client system 505 and a host system 510 through a communication link 515. Client system 505 typically includes one or more client devices 520 and one or more client controllers 525 for controlling the client devices 520. Host system 510 typically includes one or more host devices 535 and one or more host controllers 540 for controlling the host devices 535. The communications link 515 may include communication pathways 550, 555 enabling communications through the one or more delivery networks 560. As shown, the client system 505 may access the Internet 565 through the host system 510.

Examples of each element within the communication system of FIG. 5 are broadly described above with respect to FIGS. 1-4. In particular, the client system 505 and the communications link 515 typically have attributes comparable to those described with respect to client systems 105, 205, 305, and 405 and communications links 115, 215, 315, and 415 of FIGS. 1-4. Likewise, the host system 510 of FIG. 5 may have attributes comparable to and illustrates one possible embodiment of the host systems 110, 210, 310, and 410 shown in FIGS. 1-4, respectively. However, FIG. 5 describes an aspect of the host system 510, focusing primarily on one particular implementation of IM host complex 590. For purposes of communicating with the IM host complex 590, the delivery network 560 is generally a telephone network.

The client system 505 includes a client device 520 and a client controller 525. The client controller 525 is generally capable of establishing a connection to the host system 510, including the OSP host complex 580, the IM host complex 590 and/or the Internet 565. In one implementation, the client controller 525 includes an IM application for communicating with servers in the IM host complex 590 utilizing exclusive IM protocols. The client controller 525 also may include applications, such as an OSP client application, and/or an Internet browser application for communicating with the OSP host complex 580 and the Internet 565, respectively.

The host system 510 includes a host device 535 and a host controller 540. The host controller 540 is generally capable of transmitting instructions to any or all of the elements of the host device 535. For example, in one implementation, the host controller 540 includes one or more software applications loaded on one or more elements of the host device 535. However, in other implementations, as described above, the host controller 540 may include any of several other programs, machines, and devices operating independently or collectively to control the host device 535.

The host system 510 includes a login server 570 capable of enabling communications with and authorizing access by client systems 505 to various elements of the host system 510, including an OSP host complex 580 and an IM host complex 590. The login server 570 may implement one or more authorization procedures to enable simultaneous access to the OSP host complex 580 and the IM host complex 590. The OSP host complex 580 and the IM host complex 590 are connected through one or more OSP host complex gateways 585 and one or more IM host complex gateways 595. Each OSP host complex gateway 585 and IM host complex gateway 595 may perform any protocol conversions necessary to enable communication between the OSP host complex 580, the IM host complex 590, and the Internet 565.

To access the IM host complex 590 to begin an instant messaging session, the client system 505 establishes a connection to the login server 570. The login server 570 typically determines whether the particular subscriber is authorized to access the IM host complex 590 by verifying a subscriber identification and password. If the subscriber is authorized to access the IM host complex 590, the login server 570 employs a hashing technique on the subscriber's screen name to identify a particular IM server 5902 for use during the subscriber's session. The login server 570 provides the client system 505 with the IP address of the particular IM server 5902, gives the client system 505 an encrypted key (i.e., a cookie), and breaks the connection. The client system 505 then uses the IP address to establish a connection to the particular IM server 5902 through the communications link 515, and obtains access to that IM server 5902 using the encrypted key. Typically, the client system 505 will be equipped with a Winsock API ("Application Programming Interface") that enables the client system 505 to establish an open TCP connection to the IM server 5902.

Once a connection to the IM server 5902 has been established, the client system 505 may directly or indirectly transmit data to and access content from the IM server 5902 and one or more associated domain servers 5904. The IM server 5902 supports the fundamental instant messaging services and the domain servers 5904 may support associated services, such as, for example, administrative matters, directory services, chat and interest groups. In general, the purpose of the domain servers 5904 is to lighten the load placed on the IM server 5902 by assuming responsibility for some of the services within the IM host complex 590. By accessing the IM server 5902 and/or the domain server 5904, a subscriber can use the IM client application to view whether particular subscribers ("buddies") are online, exchange instant messages with particular subscribers, participate in group chat rooms, trade files such as pictures, invitations or documents, find other subscribers with similar interests, get customized news and stock quotes, and search the Web.

In the implementation of FIG. 5, the IM server 5902 is directly or indirectly connected to a routing gateway 5906. The routing gateway 5906 facilitates the connection between the IM server 5902 and one or more alert multiplexors 5908, for example, by serving as a link minimization tool or hub to connect several IM servers to several alert multiplexors. In general, an alert multiplexor 5908 maintains a record of alerts and subscribers registered to receive the alerts.

Once the client system 505 is connected to the alert multiplexor 5908, a subscriber can register for and/or receive one or more types of alerts. The connection pathway between the client system 505 and the alert multiplexor 5908 is determined by employing another hashing technique at the IM server 5902 to identify the particular alert multiplexor 5908 to be used for the subscriber's session. Once the particular multiplexor 5908 has been identified, the IM server 5902 provides the client system 505 with the IP address of the particular alert multiplexor 5908 and gives the client system 505 an encrypted key (i.e., a cookie). The client system 505 then uses the IP address to connect to the particular alert multiplexor 5908 through the communication link 515 and obtains access to the alert multiplexor 5908 using the encrypted key.

The alert multiplexor 5908 is connected to an alert gate 5910 that, like the IM host complex gateway 595, is capable of performing the necessary protocol conversions to form a bridge to the OSP host complex 580. The alert gate 5910 is the interface between the IM host complex 590 and the physical servers, such as servers in the OSP host complex 580, where state changes are occurring. In general, the information regarding state changes will be gathered and used by the IM host complex 590. However, the alert multiplexor 5908 also may communicate with the OSP host complex 580 through the IM gateway 595, for example, to provide the servers and subscribers of the OSP host complex 580 with certain information gathered from the alert gate 5910.

The alert gate 5910 can detect an alert feed corresponding to a particular type of alert. The alert gate 5910 may include a piece of code (alert receive code) capable of interacting with another piece of code (alert broadcast code) on the physical server where a state change occurs. In general, the alert receive code installed on the alert gate 5910 instructs the alert broadcast code installed on the physical server to send an alert feed to the alert gate 5910 upon the occurrence of a particular state change. Upon detecting an alert feed, the alert gate 5910 contacts the alert multiplexor 5908, which in turn, informs the client system 505 of the detected alert feed.

In the implementation of FIG. 5, the IM host complex 590 also includes a subscriber profile server 5912 connected to a database 5914 for storing large amounts of subscriber profile data. The subscriber profile server 5912 may be used to enter, retrieve, edit, manipulate, or otherwise process subscriber profile data. In one implementation, a subscriber's profile data includes, for example, the subscriber's buddy list, alert preferences, designated stocks, identified interests, and geographic location. The subscriber may enter, edit and/or delete profile data using an installed IM client application on the client system 505 to interact with the subscriber profile server 5912.

Because the subscriber's data is stored in the IM host complex 590, the subscriber does not have to reenter or update such information in the event that the subscriber accesses the IM host complex 590 using new or a different client system 505. Accordingly, when a subscriber accesses the IM host complex 590, the IM server 5902 can instruct the subscriber profile server 5912 to retrieve the subscriber's profile data from the database 5914 and to provide, for example, the subscriber's buddy list to the IM server 5902 and the subscriber's alert preferences to the alert multiplexor 5908. The subscriber profile server 5912 also may communicate with other servers in the OSP host complex 590 to share subscriber profile data with other services. Alternatively, user profile data may be saved locally on the client device 505.

Figure 6:
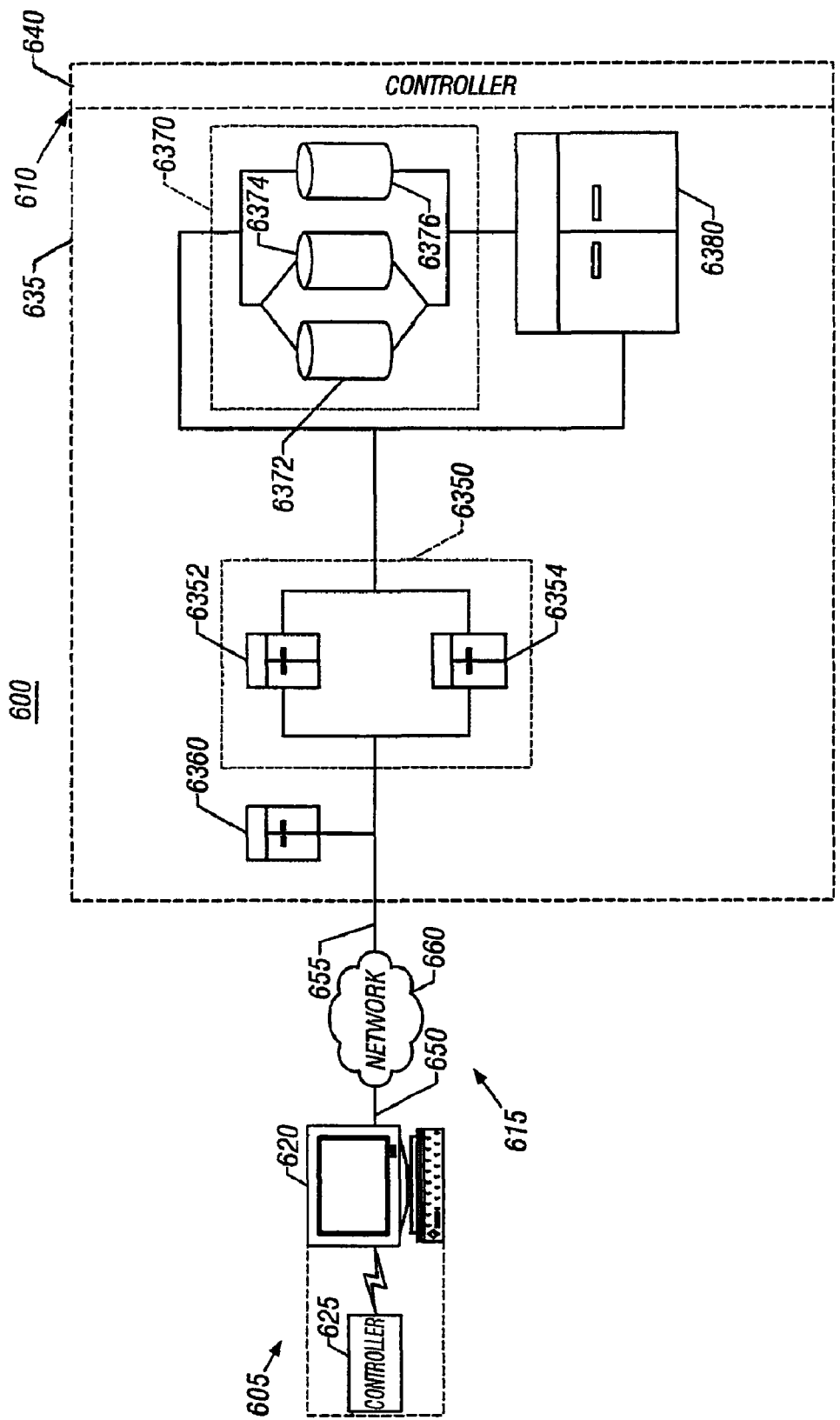

Referring to FIG. 6, a communications system 600 is capable of delivering and exchanging information between a client system 605 and a host system 610 through a communication link 615. Client system 605 typically includes one or more client devices 620 and one or more client controllers 625 for controlling the client devices 620. Host system 610 typically includes one or more host devices 635 and one or more host controllers 640 for controlling the host devices 635. The communication link may include communication pathways 650, 655 enabling communications through the one or more delivery networks 660. The network 660 may be any known or described delivery network including, but not limited, to a telephone network and/or the Internet.

Examples of each element within the communication system of FIG. 6 are broadly described above with respect to FIGS. 1-5. In particular, the client system 605 and the communications link 615 typically have attributes comparable to those described with respect to client systems 105, 205, 305, 405, and 505 and communications links 115, 215, 315, 415, and 515 of FIGS. 1-5. Likewise, the host system 610 of FIG. 6 may have attributes comparable the host system 110, 210, 310, 410, and 510 shown in FIGS. 1-5 and may illustrate one possible implementation of those systems. FIG. 6 describes an aspect of the host system 610, focusing primarily on one particular implementation of the host device 635.

The client system 605 includes a client device 620 and a client controller 625. The client controller 625 is capable of establishing a connection to the host system 610 through the delivery network 615. In one implementation, the client controller 625 includes one or more applications, such as an IM application, an OSP application, and/or an internet browser application.

The host system 610 includes a host device 635 and a host controller 640. The host controller 640 is generally capable of transmitting instructions to any or all of the elements of the host device 635. For example, in one implementation, the host controller 640 includes one or more software applications loaded on one or more elements of the host device 635. However, in other implementations, as described above, the host controller 640 may include any of several other programs, machines, and devices operating independently or collectively to control the host device 635.

The host device 635 includes a mail gateway 6350 having a send mail server 6352 and a read mail server 6354. The send mail server 6352 is configured to perform functions relating to transmitting electronic data. The read mail server 6354 is configured to perform functions relating to receiving and necessary electronics data. The mail gateway 6350 is in communication with one or more processing servers 6360.

The mail gateway 6350 also is in communication with the storage area 6370 and a tandem database 6380. The storage area 6370 includes electronic content databases 6372, 6374 and attachment database 6376. The tandem database 6380 includes a system of folders that stores electronic data for subscribers of the host system 610.

Figure 7:
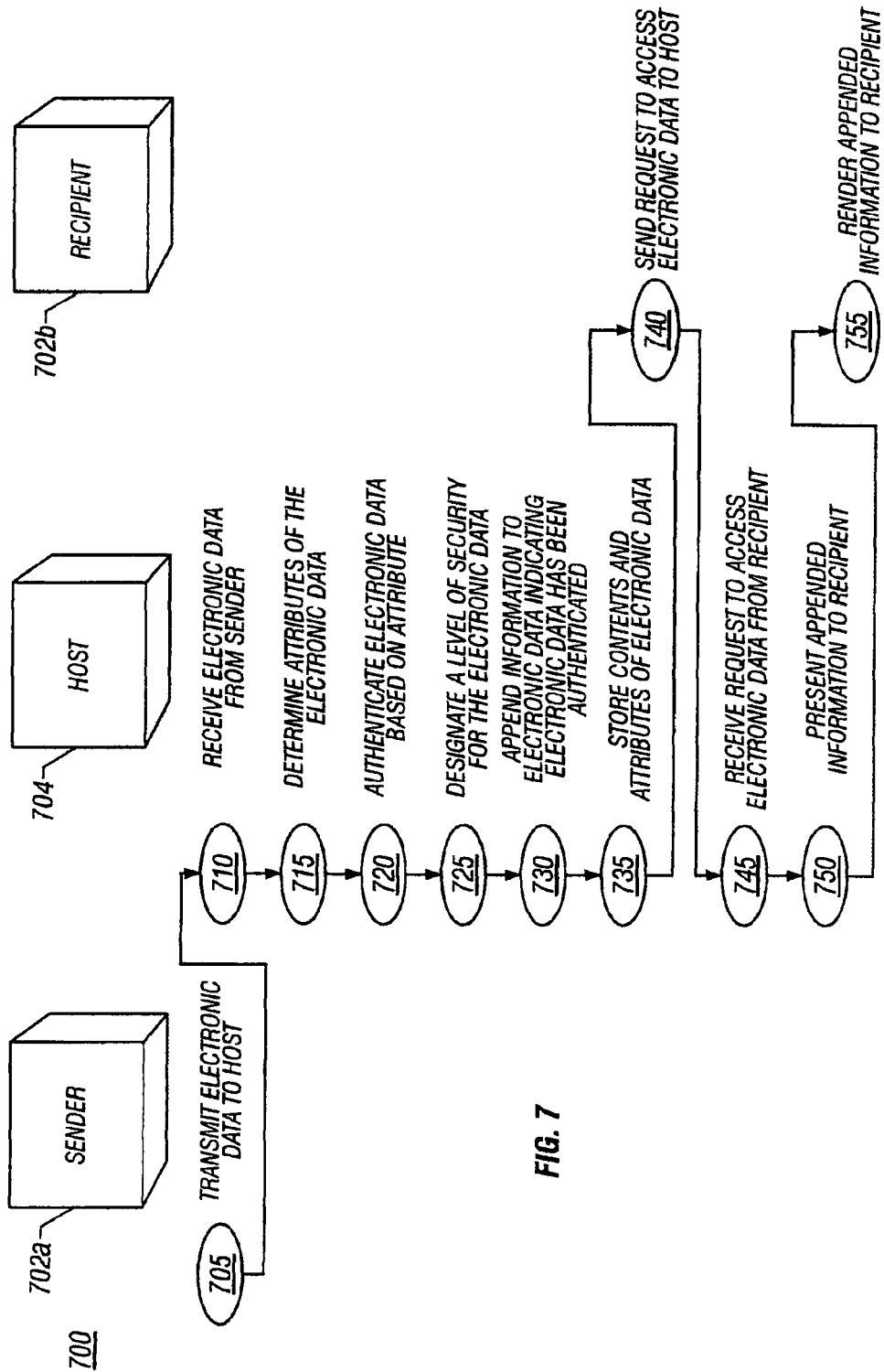
FIG. 7 is a flow chart of a communications method that may be implemented by system of FIG. 1.

Referring to FIG. 7, a sender 702a, a recipient 702b, and a host 704 interact according to a procedure 700 to transmit electronic data. The procedure 700 may be implemented by any type of hardware, software, device, computer, computer system, equipment, component, program, application, code, storage medium, or propagated signal.

Examples of each element of FIG. 7 are broadly described above with respects to FIGS. 1-6. In particular, the sender 702a and the recipient 702b typically have attributes comparable to those described with respect to client devices 120, 220, 320, 420, 520, and 620 and/or client controllers 125, 225, 325, 425, 525, and 625. The host 704 typically has attributes comparable to those described above with respect to host devices 135, 235, 335, 435, 535, and 635 and/or host controllers 140, 240, 340, 440, 540, and 640. The sender 702a, the recipient 702b and/or the host 704 may be directly or indirectly interconnected through a known or described delivery network.

Initially, the sender 702a transmits electronic data to the host 704 (step 705). In one implementation, the sender 702a aids client system 605 transmitting electronic data through a communications link 615 to the host system 610. In another implementation, the sender 702a is a processing server 6360 within the host system 610. For example, the processing server 6360 may be a server arranged to send a welcome message to new subscribers to the host system 610.

The host 704 receives the electronic data from the sender (step 710). In one implementation, the mail gateway 6350 receives the electronic data from the client system 605 and/or the processing server 6360. Typically, the mail gateway 6350 will receive electronic content from subscribers through a telephone network and will receive electronic content from non-subscribers through the Internet.

After the host 704 receives the electronic data from the sender 702a (step 710), the host 704 determines attributes of the electronic data (step 715). In one implementation, the read mail server 6352 of the mail gateway 6350 determines attributes of the electronic data including the author of the electronic data, the recipient(s) of the electronic data, the subject of the electronic data, the date and time of the transmission, and/or whether the electronic data contains attachments or embedded images.

The host 704 authenticates the electronic data based on one or more attributes (step 720). Typically, only selected users will be authorized to transmit authenticated electronic data. For example, operations security personnel may selectively authorize certain employees and/or process servers 6360 to transmit authenticated electronic data based on criteria. Criteria may include the purpose, the process, the security, and/or the internal account of the sender.

After the electronic data has been authenticated (step 720), the host 704 designates a level of security for the electronic data (step 725). In one implementation, the authenticated electronic data is designated as either official or unofficial. In other implementations, however, there may be several different levels of security. Additionally, the electronic data may be designated as being sent from a particular business partner of the OSP.

The host 704 then appends information to the electronic data indicating that the electronic data has been authenticated (step 730). In one implementation, bits of information are inserted into the header of the electronic data. The appended information may correspond to the particular level of security of the sender 702a.

Next, the host 704 stores the contents and attributes of the electronic data (step 735). In one implementation, contents of the electronic data are stored in the storage area 6360 and the attributes of the electronic data are stored in the tandem database 6380. More particularly, the body of the electronic data is stored in electronic content databases 6362, 6364 and any attachments are stored in the attachment database 6366. In this example, the body of the electronic data is stored twice to insure availability of the electronic data body. Due to the typically large sizes of attachments, however, such objects are only stored once to conserve memory space.

The tandem database 6380 includes a system of folders corresponding to the subscribers of the host system 610. Each folder may have properties assigned by the subscriber including, for example, properties for filtering electronic content from certain sources. As electronic data is received, the folder stores the attributes of the electronic data including the location(s) of the electronic data content in the storage area 6360.

When the recipient 702b desires to access stored electronic data, the recipient 702b sends a request to access the electronic data to the host 704 (step 740). The host 704 receives the request to access the electronic data from the recipient 702b (step 745). The host 704 sends the appended information to the recipient 702b (step 750). The appended information may be presented to the recipient with the attributes of the electronic data and/or the contents of the electronic data.

When presented with the appended information, the recipient 702b renders the appended information to a user (step 755). The appended information may be rendered as a distinguishable icon in a listing of folder entries and/or a distinguishable chrome (i.e., border) around the contents of the electronic data in a message. In one implementation, the chrome is distinguishable by being a different color from regular messages (e.g., unofficial email) and by including words and/or symbols relating to its authenticated status.

Figure 8:
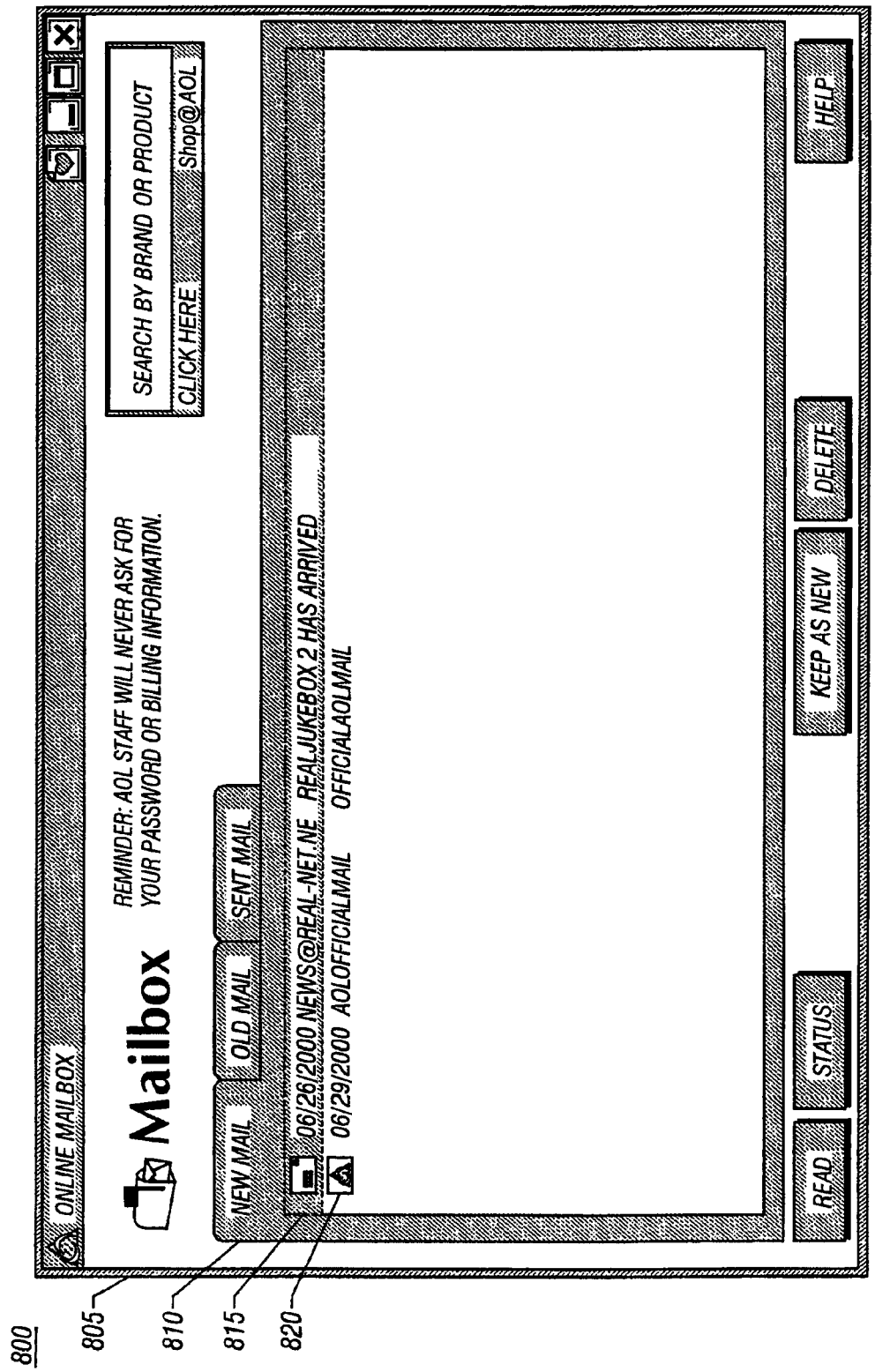
FIGS. 8-9B are illustrations of different graphical user interfaces that may be provided by the system of FIG. 1.

Referring to FIG. 8, a UI 800 illustrates an example of how the appended information may be rendered. The UI 800 includes an Online Mailbox template 805. The Online Mailbox template 805 includes a New Mail folder 810 for displaying attributes of received messages. Such attributes includes, but are not limited to, the date the message was received, the sender of the message, and the subject of the message.

As shown in FIG. 8, the New Mail folder 810 displays attributes of two received messages. The first message is a product update message received from a particular supplier, and the second message is an official message received from an authenticated sender of official mail. The first message is associated with a first icon 815, and the second message is associated with a second icon 820. The first icon 815 and the second icon 820 are distinguishable from each other by color and symbol. Namely, the first icon 815 appears as a yellow envelope, and the second icon 820 appears as a blue envelope including the AOL triangle.

In one implementation, the first icon 815 is a standard icon associated with all unofficial messages and the second icon 820 is a special icon associated only with official messages. In another implementation, the particular subscriber is authenticated and the first icon 815 is associated with all messages received from the authenticated supplier. In such an implementation, the first icon 815 is distinguishable from other special icons associated with authenticated messages (e.g., the second icon 820) as well as the standard icon associated with unauthenticated messages.

Figure 9A:
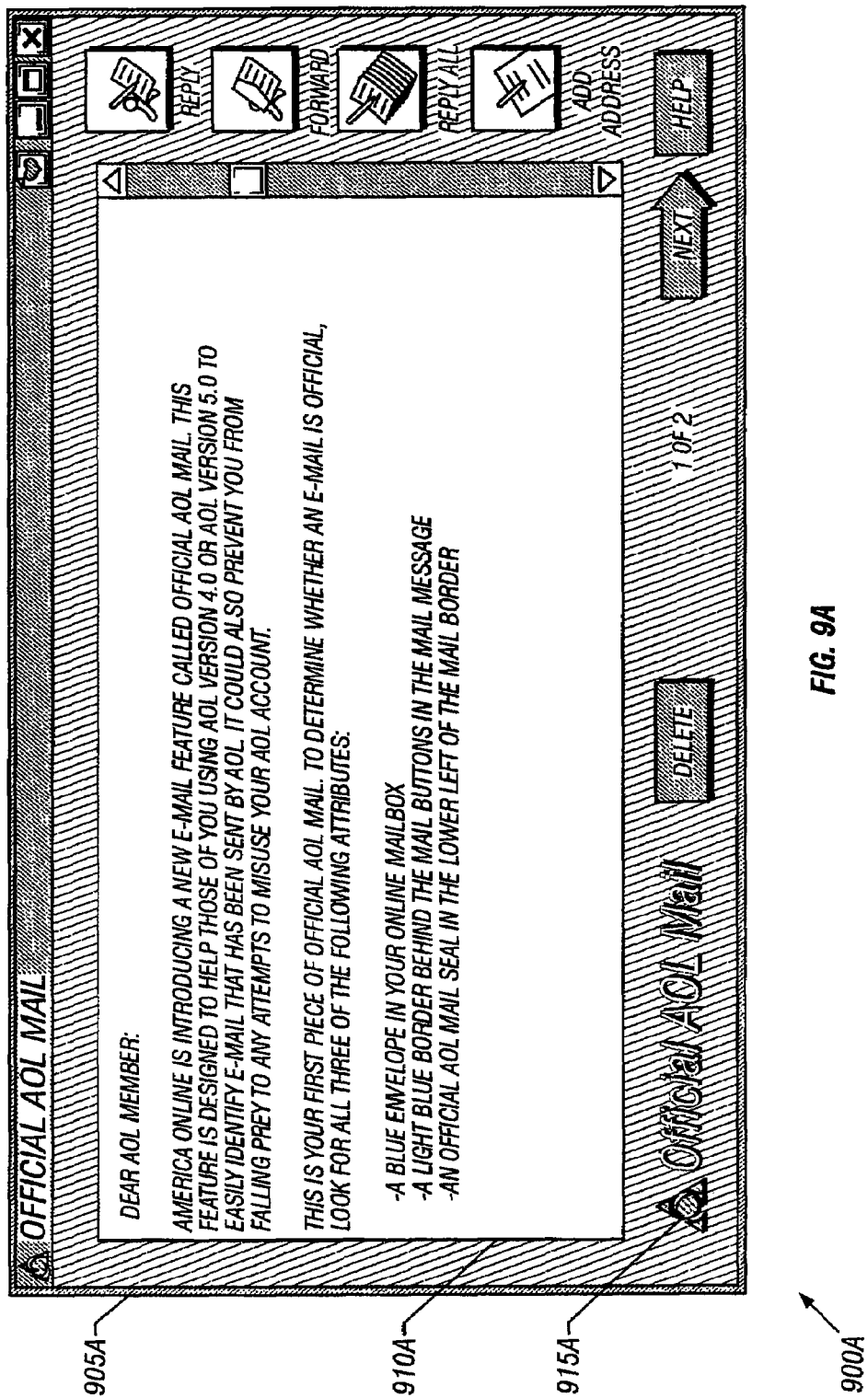

Referring to FIGS. 9A and 9B, a UI 900A associated with an authenticated message (e.g., official mail) is distinguishable from a UI 900B associated with an unauthenticated message (e.g., unofficial mail). The UI 900A includes an Official AOL Mail template 905A having a distinguishable border 910A. In contrast, the UI 900B includes an Unofficial Mail template 905B having a standard border 910B. As shown, the color of the border 910A (e.g., light blue) differs from the color (e.g., white) of the border 910B. In addition, the border 910A includes an Official AOL Mail seal 915A in the lower left corner of the Official AOL Mail template 905A. Such a seal is conspicuously absent from the border 910B of the Unofficial Mail template 905B.

The general aspects described above may be applied to either an e-mail message and/or an instant message. Other implementations are within the scope of the following claims.

What is claimed is:

1. A method of exchanging instant messages in a presence based messaging system, the method comprising:
receiving, at a presence-based message system, first instant messaging content addressed to an intended user from a first user;
receiving, at the presence-based message system, trusted instant messaging content addressed to the intended user from a trusted user;
determining, at the presence-based message system, that the first user has normal privileges to exchange instant messages;
determining, at the presence-based message system, that the trusted user has special privileges that enable the trusted user to exchange trusted instant messages;
packaging, at the presence-based message system, the first instant messaging content as a first instant message;
configuring, at the presence-based message system, the first instant message as an unofficial instant message using an unofficial format;
packaging, based on determining that the trusted user has special privileges that enable the trusted user to exchange the trusted instant messages, the trusted instant messaging content as a trusted instant message;
configuring, at the presence-based message system, the trusted instant message to be rendered using a trusted format that distinguishes unofficial instant messages from trusted instant messages using a presented seal that identifies the trusted instant message presented to the intended user as originating from the trusted user.

2. The method of claim 1 wherein configuring the trusted information includes configuring the trusted information to further render to an intended recipient as an icon indicative of endorsement.

3. The method of claim 1 wherein configuring the trusted information includes configuring the trusted information to further render to an intended recipient content of electronic data.

4. The method of claim 1 wherein configuring the trusted information includes configuring the trusted information to further render to an intended recipient attributes of the trusted information.

5. The method of claim 1 wherein configuring the trusted information includes configuring the trusted information to further render to an intended recipient a border in a protected chrome.

6. The method of claim 1 wherein configuring the trusted information includes configuring the trusted information to further render to an intended recipient a header in a protected chrome.

7. The method of claim 1 wherein configuring the trusted information includes configuring the trusted information to further render to an intended recipient an identity of a trusted sender in a special format different from an second sender that is not trusted.

8. A system configured to exchanging instant messages in a presence based messaging system, the system comprising:
a processor, and
instructions that when executed on the processor cause the processor to perform operations that include:
receiving, at a presence-based message system, first instant messaging content addressed to an intended user from a first user;
receiving, at the presence-based message system, trusted instant messaging content addressed to the intended user from a trusted user;
determining, at the presence-based message system, that the first user has normal privileges to exchange instant messages;
determining, at the presence-based message system, that the trusted user has special privileges that enable the trusted user to exchange trusted instant messages;

packaging, at the presence-based message system, the first instant messaging content as a first instant message;

configuring, at the presence-based message system, the first instant message as an unofficial instant message using an unofficial format;

packaging, based on determining that the trusted user has special privileges that enable the trusted user to exchange the trusted instant messages, the trusted instant messaging content as a trusted instant message;

configuring, at the presence-based message system, the trusted instant message to be rendered using a trusted format that distinguishes unofficial instant messages from trusted instant messages using a presented seal that identifies the trusted instant message presented to the intended user as originating from the trusted user.

9. The system of claim 8 wherein configuring the trusted information includes configuring the trusted information to further render to an intended recipient as an icon indicative of endorsement.

10. The system of claim 8 wherein configuring the trusted information includes configuring the trusted information to further render to an intended recipient content of electronic data.

11. The system of claim 8 wherein configuring the trusted information includes configuring the trusted information to further render to an intended recipient attributes of the trusted information.

12. The system of claim 8 wherein configuring the trusted information includes configuring the trusted information to further render to an intended recipient a border in a protected chrome.

13. The system of claim 8 wherein configuring the trusted information includes configuring the trusted information to further render to an intended recipient a header in a protected chrome.

14. The system of claim 8 wherein configuring the trusted information includes configuring the trusted information to further render to an intended recipient an identity of a trusted sender in a special format different from an second sender that is not trusted.

15. A computer program on a nontransitory computer readable medium comprising instructions that when executed on a processor cause the processor to perform operations that include:

receiving, at a presence-based message system, first instant messaging content addressed to an intended user from a first user;

receiving, at the presence-based message system, trusted instant messaging content addressed to the intended user from a trusted user;

determining, at the presence-based message system, that the first user has normal privileges to exchange instant messages;

determining, at the presence-based message system, that the trusted user has special privileges that enable the trusted user to exchange trusted instant messages;

packaging, at the presence-based message system, the first instant messaging content as a first instant message;

configuring, at the presence-based message system, the first instant message as an unofficial instant message using an unofficial format;

packaging, based on determining that the trusted user has special privileges that enable the trusted user to exchange the trusted instant messages, the trusted instant messaging content as a trusted instant message;

configuring, at the presence-based message system, the trusted instant message to be rendered using a trusted format that distinguishes unofficial instant messages from trusted instant messages using a presented seal that identifies the trusted instant message presented to the intended user as originating from the trusted user.

* * * * *